(12) United States Patent
Smith et al.

(10) Patent No.: US 9,826,854 B2
(45) Date of Patent: Nov. 28, 2017

(54) DEVICE FOR EXTRACTING ZEST FROM A FRUIT AND RELATED METHODS

(71) Applicant: Lifetime Brands, Inc., Garden City, NY (US)

(72) Inventors: Jason Dwayne Smith, Snohomish, WA (US); Jasper E. Wheeler, Brooklyn, NY (US); William Edwin Drinkwater, Greenlawn, NY (US)

(73) Assignee: LIFETIME BRANDS, INC., Garden City, NY (US)

( * ) Notice: Subject to any disclaimer, the term of this patent is extended or adjusted under 35 U.S.C. 154(b) by 258 days.

(21) Appl. No.: 14/685,835

(22) Filed: Apr. 14, 2015

(65) Prior Publication Data
US 2015/0289703 A1    Oct. 15, 2015

Related U.S. Application Data

(60) Provisional application No. 61/979,475, filed on Apr. 14, 2014.

(51) Int. Cl.
A47J 17/16    (2006.01)

(52) U.S. Cl.
CPC .................................... *A47J 17/16* (2013.01)

(58) Field of Classification Search
CPC combination set(s) only.
See application file for complete search history.

(56) References Cited

U.S. PATENT DOCUMENTS

| 255,856 | A | * | 4/1882 | Heizmann | A23N 4/14 99/543 |
| 256,214 | A | * | 4/1882 | Heizmann | A23N 4/14 99/541 |
| 256,800 | A | * | 4/1882 | Holton | A23N 4/14 99/537 |
| 273,418 | A | * | 3/1883 | Whittemore | A23N 4/14 99/592 |
| 360,527 | A | * | 4/1887 | Hudson | A23N 4/14 99/541 |

(Continued)

FOREIGN PATENT DOCUMENTS

GB    2234892    2/1991

OTHER PUBLICATIONS

International Search Report and Written Opinion for International Application No. PCT/US2015/025660, dated Jul. 20, 2015. (8 pages).

*Primary Examiner* — Anne M Antonucci
*Assistant Examiner* — Renee M Larose
(74) *Attorney, Agent, or Firm* — Tutunjian & Bitetto, P.C.

(57) ABSTRACT

A device for extracting zest from a fruit includes a body, a carrier coupled to the body, and a blade coupled to the body. The carrier moves the fruit relative to the blade and holds the fruit as the blade separates a portion of the flavedo from the pith of the fruit's peel to extract zest from the fruit. The device also includes an arm that urges the blade against the fruit's peel to generate contact pressure as the carrier moves the fruit relative to the blade, and that allows the blade to move toward and away from the carrier to accommodate the contour of the fruit's peel, which is often curved. The blade includes a plurality of teeth, each configured to cut a portion of the fruit's flavedo from the fruit's pith without separating the pith from the berry.

12 Claims, 9 Drawing Sheets

(56) References Cited

U.S. PATENT DOCUMENTS

| | | | |
|---|---|---|---|
| 537,681 A | 4/1895 | Furbish | |
| 5,558,011 A * | 9/1996 | Heim | A23N 7/026 99/588 |
| 5,950,528 A * | 9/1999 | Wang | A23N 7/026 99/542 |
| 6,053,098 A * | 4/2000 | Yamamoto | B26D 3/11 83/425.1 |
| D465,137 S * | 11/2002 | Wong | A47J 17/16 D7/693 |
| 6,854,383 B2 * | 2/2005 | Wang | A47J 17/16 99/542 |
| 7,077,058 B2 * | 7/2006 | Muro | A47J 17/16 99/541 |
| D669,324 S * | 10/2012 | Bodum | A23N 7/00 D7/693 |
| 9,375,858 B2 * | 6/2016 | Farid | A23N 7/00 |
| 2013/0334347 A1 | 12/2013 | Willis | |

* cited by examiner

DEVICE FOR EXTRACTING ZEST FROM A FRUIT AND RELATED METHODS

CROSS REFERENCE TO RELATED APPLICATIONS

This application claims priority from U.S. Provisional Application Ser. No. 61/979,475 filed on Apr. 14, 2014, the entire contents of which is incorporated herein by reference.

BACKGROUND

1. Technical Field

The present principles relate to food preparation devices. More particularly, it relates to a device for extracting zest from a fruit.

2. Discussion of Related Art

Most fruits include one or more seeds, a berry that surrounds the one or more seeds, and a peel or rind that covers the berry. For example, a lemon and other citrus fruits, such as an orange and a lime, include a plurality of seeds surrounded by juice filled hairs that make-up the berry, and a peel that covers the juice filled hairs or berry. The peel of a citrus fruit includes an outermost layer—the flavedo—and a layer between the flavedo and the berry—the pith. The flavedo is shinny, brightly colored, textured and rich in the fruit's volatile oil, also known as the fruit's zest. The pith is a white, fibrous membrane that helps protect the berry that it surrounds. Because citrus fruits are flavorful, the berry's juice and the flavedo's volatile oil, or zest, are often used to enhance and/or modify a food's flavor.

The volatile oil or zest is particularly popular because it is extremely flavorful, and thus can be used to flavor a food without adding much liquid to the food. Because the pith is fibrous and not that flavorful relative to the zest, most cooks carefully remove a fruit's flavedo from the fruit's pith when extracting the zest from a fruit. Frequently, the process of extracting a fruit's zest from the fruit includes delicately rubbing the fruit's flavedo against a fine grater. Often this is done by grasping the fruit in one hand, holding the grater against a cutting board or the inside of a bowl with the other hand, and then scrapping the flavedo against the grater.

Unfortunately, this process has several drawbacks. It requires careful attention and a deft touch to make sure that none of the fruit's pith is extracted with the flavedo as the fruit's peel is scrapped against the grater. In a busy kitchen, a skilled cook has limited time to carefully extract the fruit's zest using this process. In addition, the process of gathering the zest in this manner is considered one of least desirable jobs in the kitchen. If rushed, a cook might extract some of the pith with the flavedo, which can adversely affect the texture of the food that will receive the zest, or the cook might scrape his knuckles or finger tips against the grater, which can adversely affect the taste and/or hygiene of the food.

SUMMARY

According to another implementation, the device for extracting zest includes a body having a post and the post having a boss. A blade arm has one end configured to be received by the post and an opposing end. The post receiving end further includes a groove for fitting over the boss, where the groove is larger than the boss. A torsion spring is positioned on the post between said body and the blade arm for biasing the blade arm in a predetermined direction toward a fruit or vegetable to be processed. A blade is coupled to an opposing end of the blade arm and is configured to separate a portion of the flavedo from the pith of a fruit or vegetable's peel while the fruit's peel contacts the blade and moves relative to the blade. A carrier is coupled to the body and configured to hold the fruit or vegetable while the blade separates a portion of the flavedo from the pith of the fruit or vegetable's peel.

According to another implementation of the present principles, the device for extracting zest includes a body having a post and a blade arm having one end configured to be received by the post and an opposing end. A blade is coupled to an opposing end of the blade arm and is configured to separate a portion of the flavedo from the pith of a fruit or vegetable's peel while the fruit or vegetable's peel contacts the blade and moves relative to the blade. A spring means is in communication with the body and the blade arm for biasing the blade arm in a predetermined direction toward a fruit or vegetable to be processed. A carrier is coupled to the body and includes a threaded rod having at one end, an auger for rotatably receiving and securing the fruit or vegetable and a rotation handle attached to an opposing end.

According to another implementation, the device for extracting zest includes a body having a post, and a blade arm having one end configured to be received by the post and opposing end. A blade is coupled to the opposing end of the blade arm and is configured to separate a portion of the flavedo from the pith of a fruit or vegetable's peel while the fruit's peel contacts the blade and moves relative to the blade. A spring is in communication with the blade arm and configured to bias the same in a predetermined direction toward a fruit or vegetable to be processed. A carrier is coupled to the body and configured to hold the fruit or vegetable while the blade separates a portion of the flavedo from the pith of the fruit or vegetable's peel. A reversing mechanism is positioned on the post and is in communication with the carrier. The reversing mechanism is configured to automatically reverse a rotation direction of the carrier without requiring the user to change the rotation direction of the handle. These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to food preparations devices that are used to extract zest from a fruit or vegetable.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In an aspect of the present principles, the system includes a screw to hold and move food, such as a fruit, vegetable, nut and candy, an arm releasably attached to a post, a spring disposed between the arm and the post to urge the arm toward a first position, and a blade releasably attachable to the arm and designed to perform a specific function, such as zesting, coring, slicing, peeling, and grating food. The system is similar to the system shown and discussed in the U.S. patent application Ser. No. 14/002,664 filed Aug. 30, 2013 and entitled "Device For Extracting Zest From A Fruit, And Related Extraction Methods", which is incorporated herein by reference. When a blade is attached to the arm and an item of food is held by the screw, the first position includes the blade contacting the item of food, so that as the screw moves the food across the blade, the blade zests, cores, slices, peels, and/or grates the food.

The system is configured to be easily and inexpensively manufactured, and easily and quickly assembled/disassembled. By making the system easy and inexpensive to manufacture, the total cost to manufacture the system can be kept low. And by making the system easy to assemble and disassemble, one can easily and quickly clean the system after each use. The system is also configured to be a modular manufacturing system (e.g.—handle held, suction or table-clamp component for anchoring the system in one's hand or on a table or workbench), which allows for reduced SKU's, inventory, manufacturing molds, and overall cost associated with expanding this technology.

Figure 1:
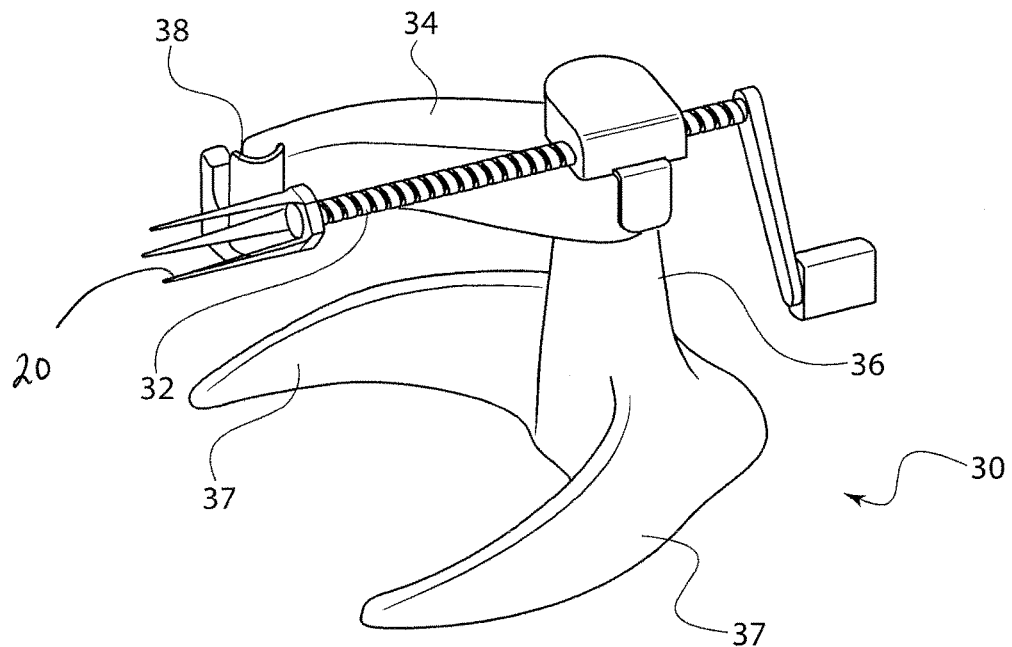
FIG. 1 shows a perspective view of the device for extracting zest according to an implementation of the present principles.
Figure 2:
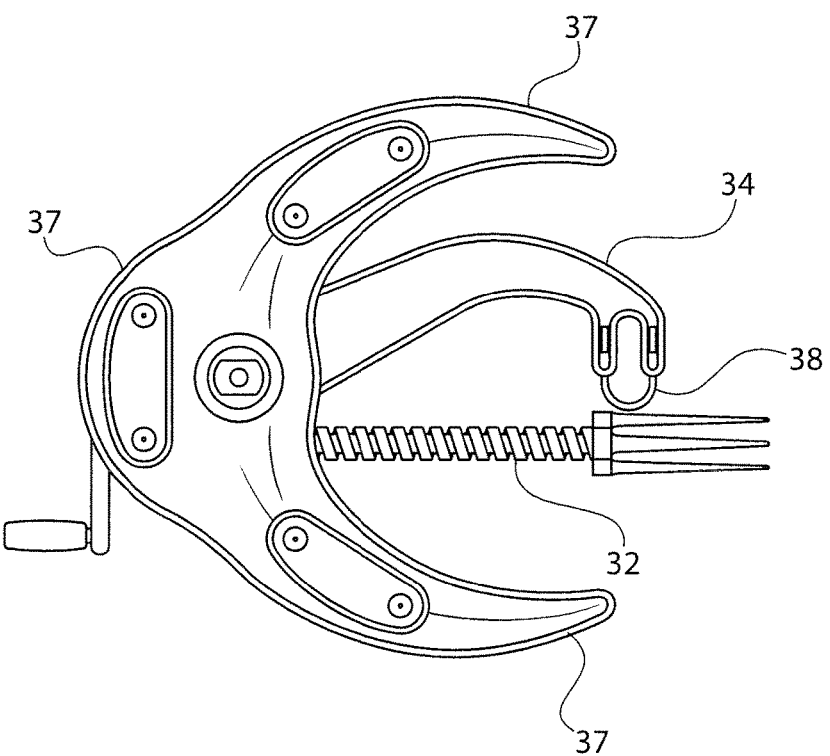
FIG. 2 shows a bottom view of the device for extracting zest according to an implementation of the present principles.
Figure 3:
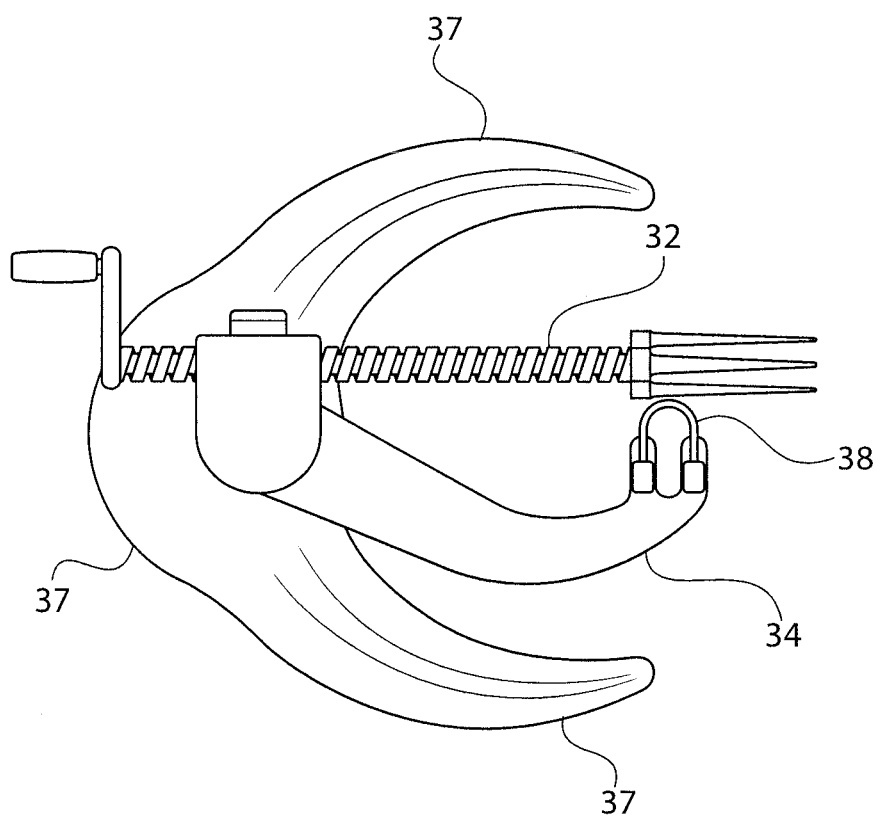
FIG. 3 shows a top view of the device for extracting zest according to an implementation of the present principles.

Each of FIGS. 1-3 shows a view of a system 30 according to an embodiment of the present principles. The system 30 includes a screw or carrier 32, an arm 34, a post 36, a base 37, and a blade 38. The arm 34, the post 36 and base 37 are each made of any desired plastic that can be injection molded into the respective configurations of each, and that can handle one's use and subsequent cleaning. The arm 34 is connected at one end to the post 36 and has an opposing end configured to carry or hold the blade 38. All molded components do not require slides in the tools, for simple molding design and multi-cavity functionality. In this embodiment, the system weighs approximately 0.6 pounds. The screw or carrier 32 may be made of any desired material, such as a metal and/or a plastic and includes a food engaging end 20 which is generally a plurality of spikes. The system 30 zests, cores, slices, peels, and grates food in manner very similar to the system shown and discussed in the above-referenced U.S. patent application Ser. No. 14/002,664.

Figure 4:
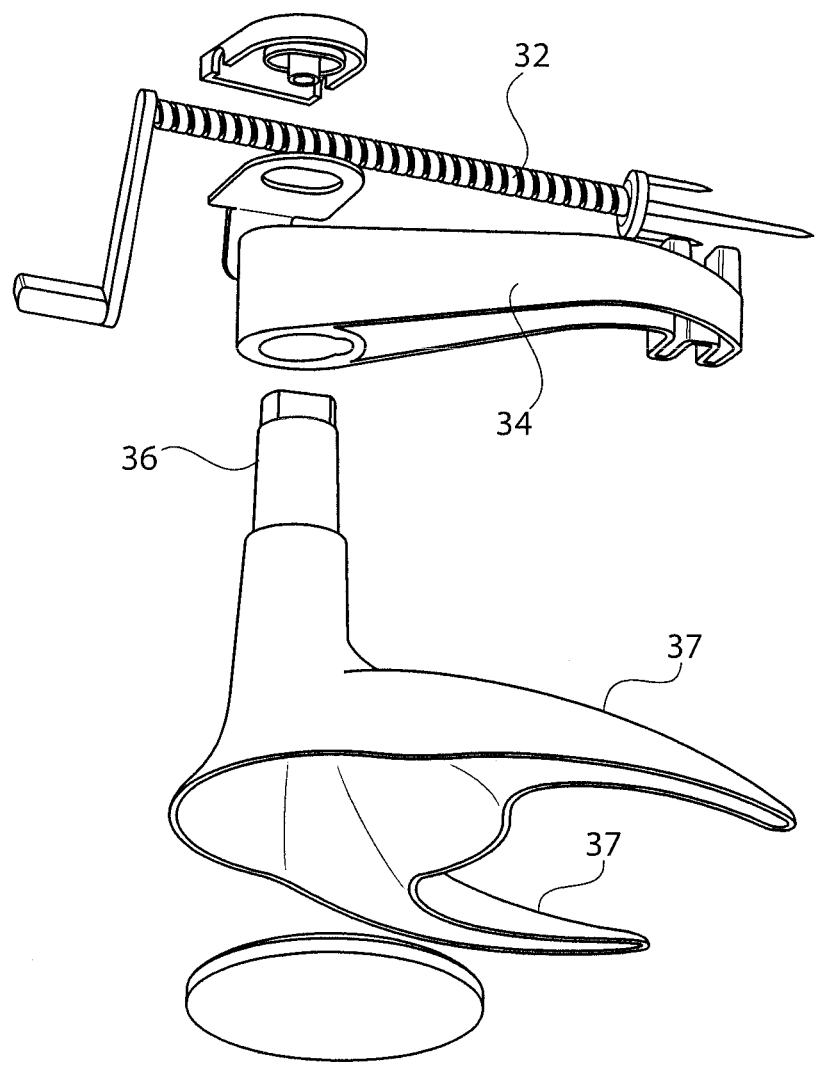
FIG. 4 shows a worm's eye exploded perspective view of the device for extracting zest according to an implementation of the present principles.
Figure 5:
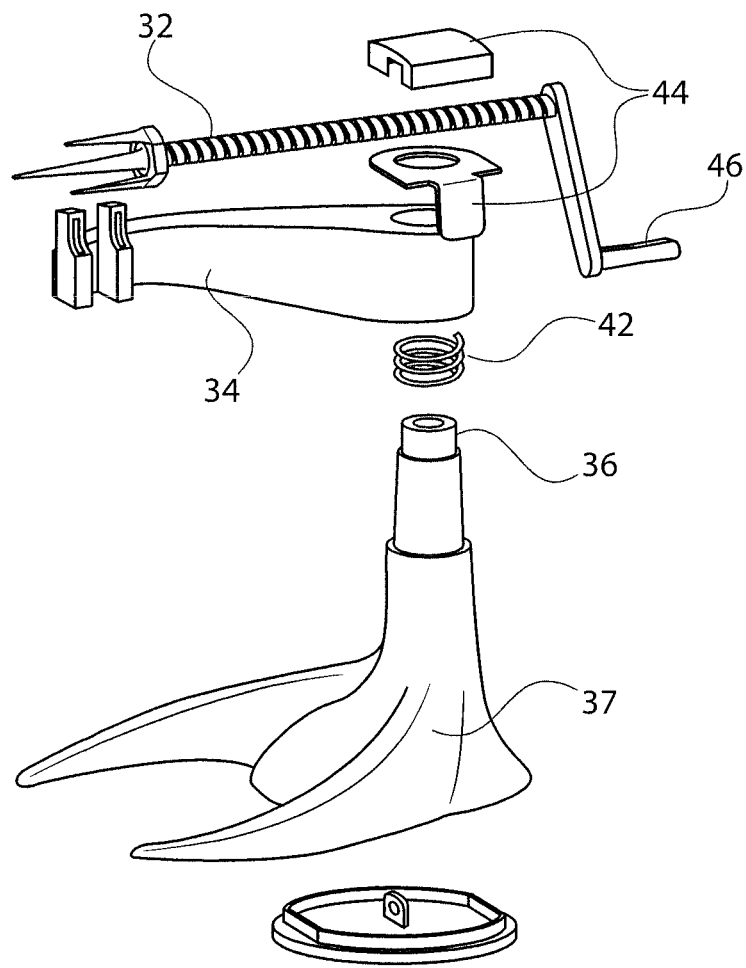
FIG. 5 shows a bird's eye perspective view of the device for extracting zest according to an implementation of the present principles.
Figure 6:
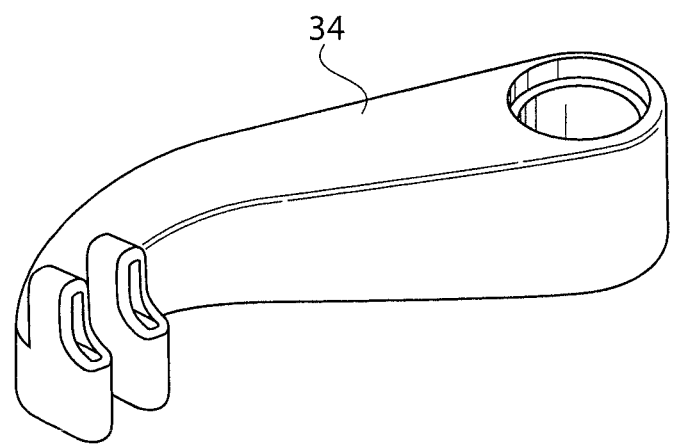
FIG. 6 is a perspective view of the blade arm as used by the device for extracting zest according to an implementation of the present principles.
Figure 7:
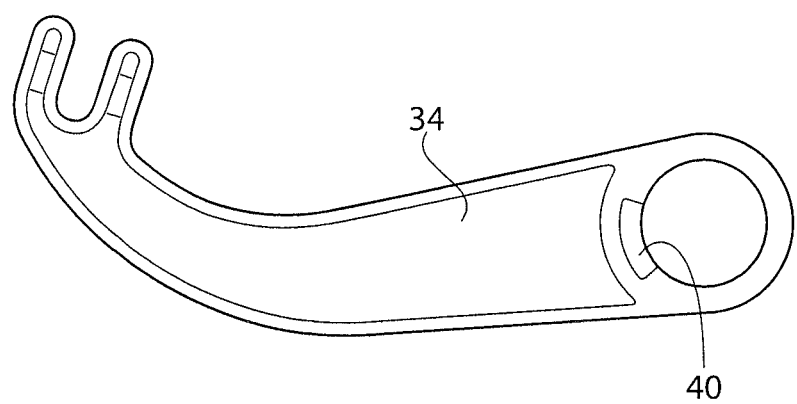
FIG. 7 is a bottom view of the blade arm as used by the device for extracting zest according to an implementation of the present principles.
Figure 11:
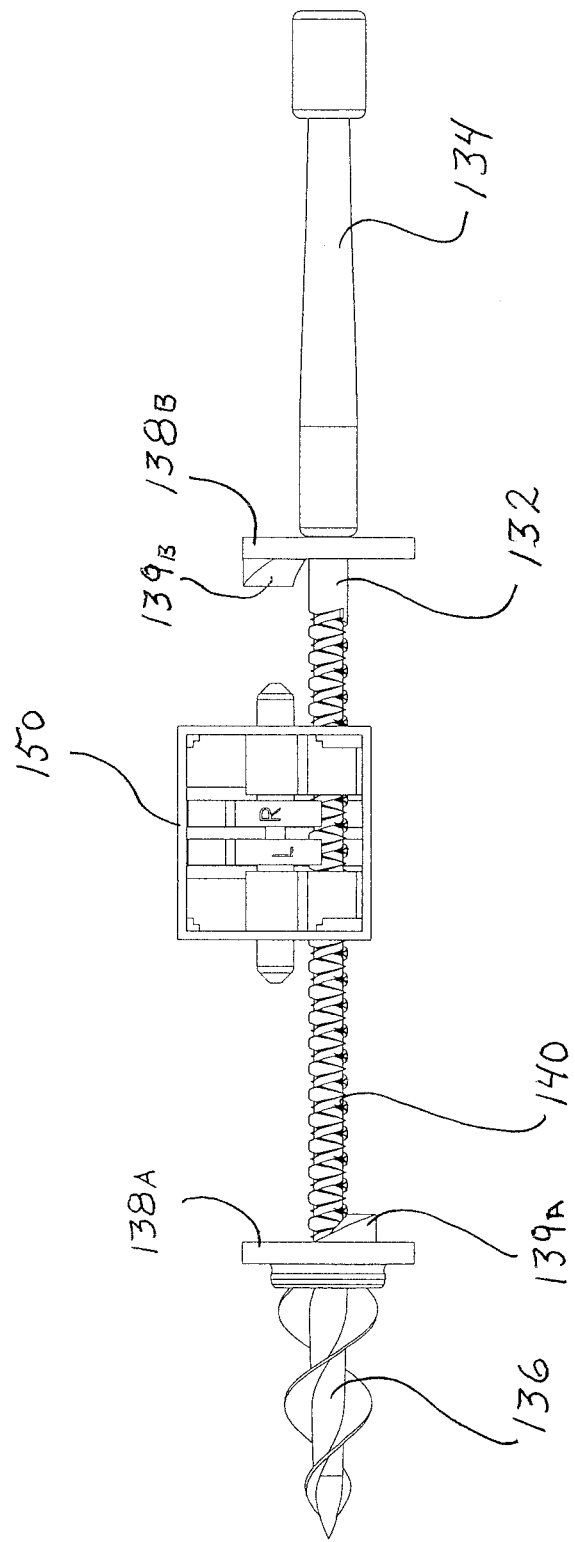
FIG. 11 shows a top view of an alternative implementation of the carrier as used by the device for extracting zest according to an implementation of the present principles.
Figure 12:
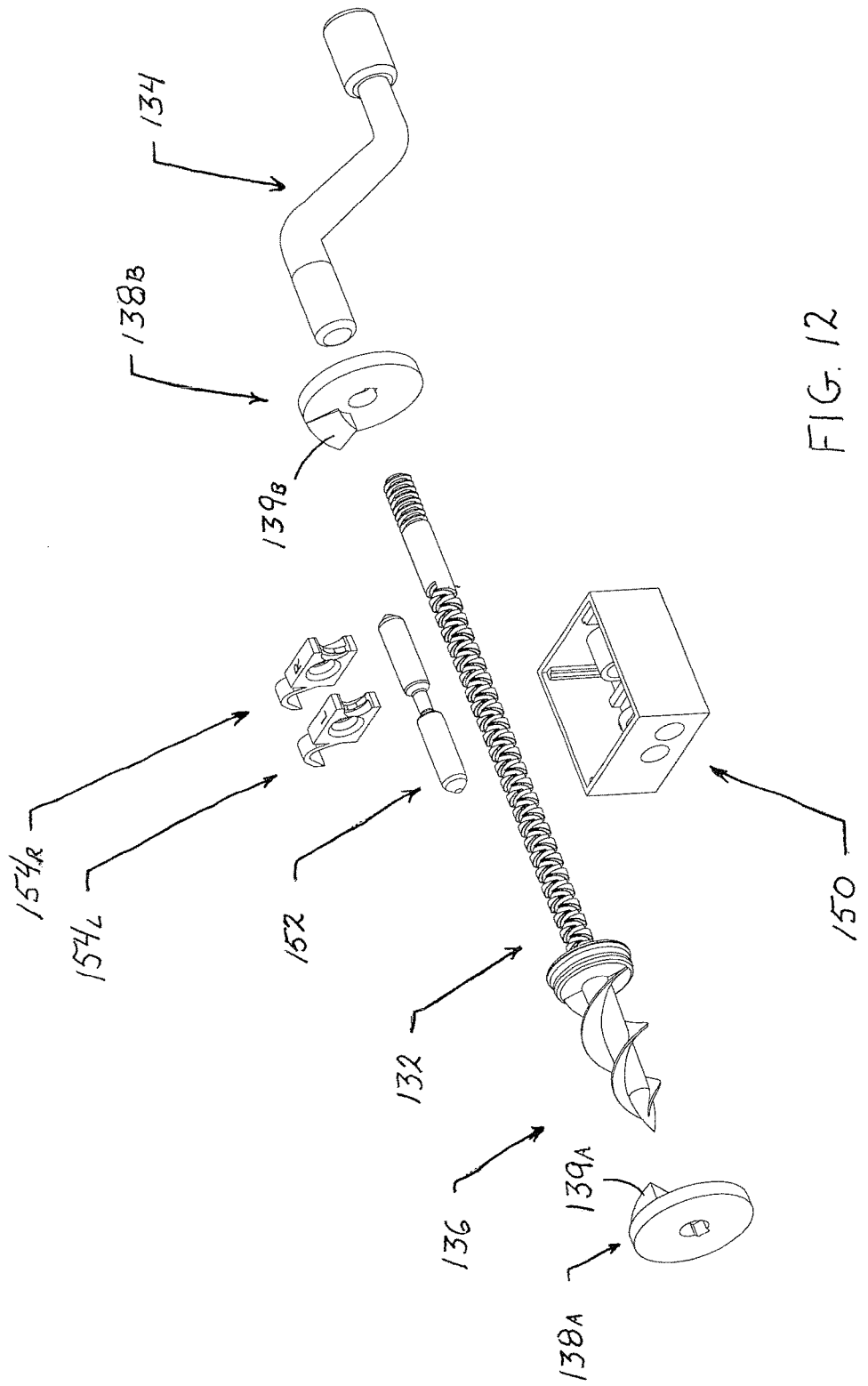
FIG. 12 is an exploded perspective view of the alternative implementation of the carrier shown in FIG. 11 as used by the device for extracting zest according to an implementation of the present principles

Each of FIGS. 4 and 5 shows an exploded view of the system 30 shown in FIGS. 1-3. The arm 34 is releasably attached to the post 36, and is limited in its travel about the post 36 by a boss 35 (see FIG. 8) on the post 36 such that, when the arm 34 is attached to the post 36, the boss 35 lies in a groove 40 (shown in FIG. 7). Because the groove 40 is longer than the boss, the arm 34 is allowed to rotate about 20 degrees relative to the post 36. To urge the arm 34 toward the first position, the system 30 includes a torsion spring 42 whose first end is held by the arm 34 and whose second end is held by the post 36. The system 30 also includes a cage 44 that surrounds a portion of the screw 32 and has at least one tooth engages and slides within the thread of the screw 32 when the screw 32 is rotated by handle 46. By mounting the cage 44 to the post 36 so that the cage's tooth or teeth won't move relative to the post when the screw 32 is rotated, the cage 44 causes the screw 32 to translate relative to the post 36 when the screw 32 rotates. To allow the blade 38 to work on the food as the food travels in both directions, toward the post 36 as well as away from the post 36, the screw's thread is configured to allow for the reverse translation of the screw 32 relative to the post 36 when the cage's tooth reaches the end of the screw 32 closest to the handle 46. More specifically, the screw's thread reverses its helical direction at either or both ends of the screw 34 so that one simply continues to turn the handle 46 in the same direction (clockwise or counter clockwise) as before to cause the screw 32 to translate in a direction opposite to the screw's previous direction. FIGS. 11 and 12 show an example of a double threaded screw/carrier 132 in accordance with this concept.

FIGS. 11 and 12 also show an alternative arrangement where a reversing mechanism or transmission 150 enables the automatic switching of rotation direction during operation of the device. The details of this embodiment will be described further below.

Figure 9:
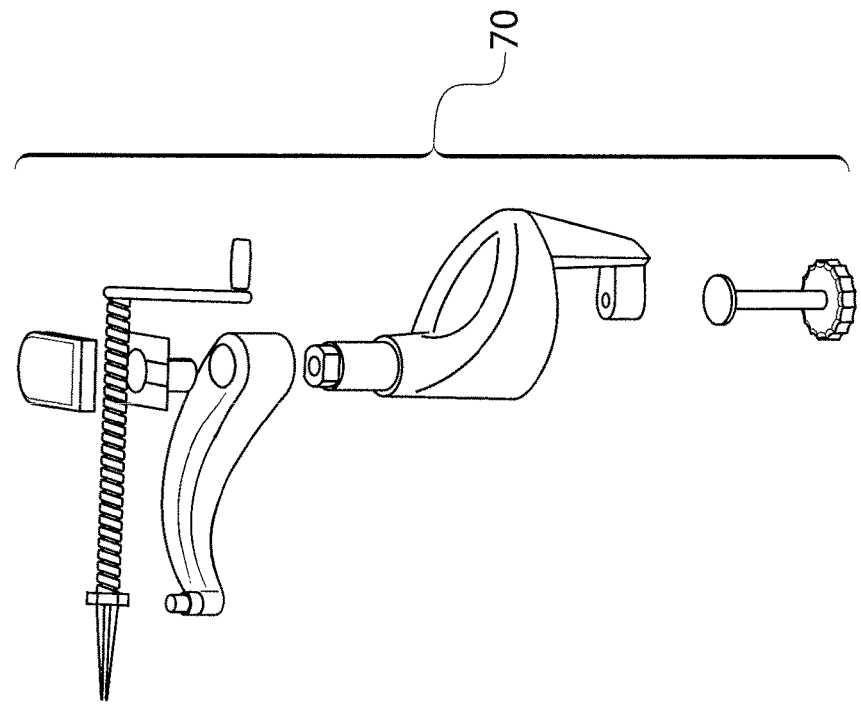
FIGS. 8 and 9, each show an exploded view of a system, according to another implementation of the present principles.
Figure 8:
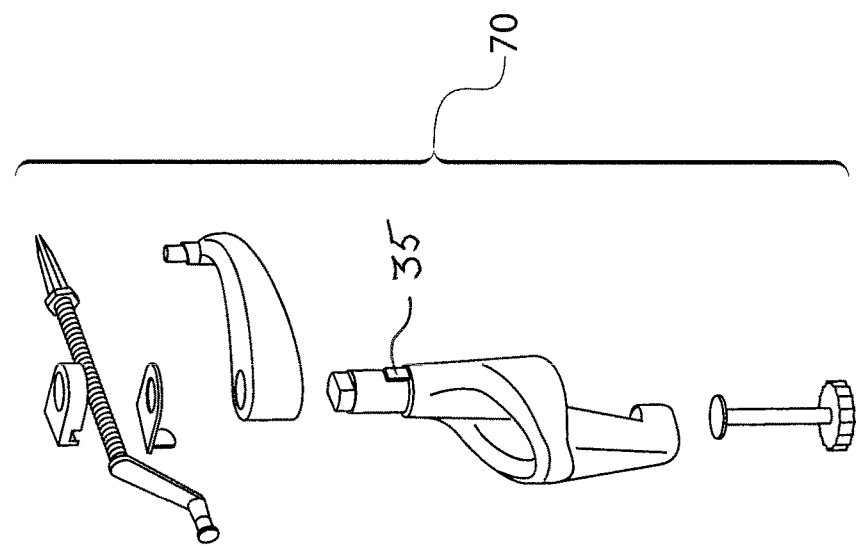

Each of FIGS. 8 and 9 shows an exploded view of a system 70, according to another embodiment of the present principles. This embodiment is similar to the system 30 except that the base of the system 70 has a smaller footprint than the system 30, and is configured to be held by a receptacle mounted to a table or workbench, such as a conventional, square receptacle for holding a can opener.

Figure 10:
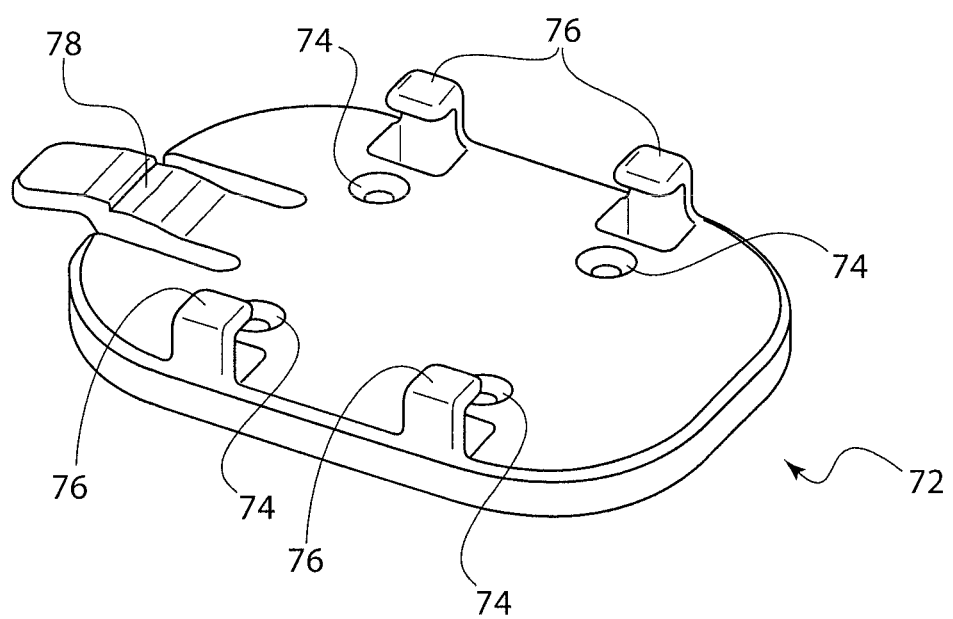
FIG. 10 shows an example of a mount that may be used to releasably secure a device for extracting zest to the top of a table or workbench while one uses the same to prepare food.

FIG. 10 shows a mount 72, according to an embodiment of the present principles that may be attached to a table or workbench and that is configured to releasably hold a system. The mount 72 includes holes 74 through which a respective one of four screws passes through to attach the mount to a table or workbench. The mount 72 also includes four detents 76 and a tongue 78 that hold a base of a system that is configured to slide under the detents and receive the tongue when the system is positioned for use.

FIGS. 11 and 12 show an example of the carrier 132 having a handle 134 at one end and a food engaging auger 136 at the other distal end. Those of skill in the art will appreciate that the food engaging auger 136 provides a must safer and easier system for attaching and detaching food (e.g., fruits and vegetables) to the same. In the prior art versions (e.g., spikes 20 of FIGS. 1-5), a user must force the food item onto the spikes along an axis of the same. This is not only difficult to perform, but seriously increases the risk of the user puncturing themselves in the event the food item breaks, or is too soft such that the spikes pass through the same. Through the use of the auger 136, a user can gently "screw" the food item onto the end of the carrier and when finished, can simply "unscrew" the remainder of the food item from the same. The edges of the auger can be such that they are not sharp to the touch, but work with the threading of the same.

As further shown, a reversing mechanism or transmission 150 can be positioned on the post and includes internal thread block parts 154 which operate in conjunction with the bar 152 to automatically change the direction of the rotation of carrier 132. As will be appreciated, at each end of the threaded portion 140 of the carrier 132, there is a first kick disk 138A and second kick disk 138B having a respective portion 139A and 139B. When the carrier 132 is rotated to either extreme, the portion 139 of the respective kick disk engages the linear rod 152 and pushes the same linearly along its own axis. This pushing causes a respective thread block 154L (reverse linear thread block) or 154R (forward linear thread block), to selectively engage or connect the threads 140 of the carrier 132. In a forward direction, thread block 154R engages the thread 140, and when portion 139B of kick disk 138B engages the linear rod 152, thread block 154R disengages from the thread 140 and thread block 154L engages the thread 4140 to start the reverse or backward direction without changing the user's rotation direction on handle 134.

Reference in the specification to "one embodiment" or "an embodiment" or "an implementation" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A device for extracting zest comprising:
   a base having a post, said post having a boss;
   a blade arm having one end configured to be received by said post and an, opposing end, said post receiving end further having a groove for fitting over said boss, said groove being larger than said boss;
   a torsion spring positioned on said post between said body and said blade arm for biasing the blade arm in a predetermined direction toward a fruit or vegetable to be processed;
   a blade coupled to the opposing end of the blade arm and being configured to separate a portion of the flavedo from the pith of a fruit or vegetable's peel while the fruit's peel contacts the blade and moves relative to the blade;
   a carrier coupled to the body, and configured to hold the fruit or vegetable while the blade separates a portion of the flavedo from the pith of the fruit or vegetable's peel; and
   means for changing a rotary direction of said carrier without requiring user intervention and while maintaining one rotating direction of said carrier.

2. The device of claim 1, wherein a size of said groove determines a range of rotation of the blade arm about an axis of said post.

3. The device of claim 1, wherein said range of rotation of the blade arm can be in a range of 0-90 degrees.

4. The device of claim 1, wherein said carrier comprises a threaded rod having at one end, means for receiving and securing the fruit or vegetable and a rotation handle attached to an opposing end.

5. The device of claim 4, wherein said means for receiving and securing comprises an auger for rotatably engaging the fruit or vegetable and thereby securing the same.

6. The device of claim 1, wherein said means for changing the rotary direction of the carrier comprises a dual thread in said carrier.

7. The device of claim 1, wherein said means for changing the rotary direction of the carrier comprises a reversing mechanism attached to the post.

8. A device for extracting zest comprising:
   a base having a post;
   a blade arm having one end configured to be received by said post and an opposing end;
   spring means in communication with the body and the blade arm for biasing the blade arm in a predetermined direction toward a fruit or vegetable to be processed;
   a blade coupled to an opposing end of the blade arm and being configured to separate a portion of the flavedo from the pith of a fruit or vegetable's peel while the fruit or vegetable's peel contacts the blade and moves relative to the blade;
   a carrier coupled to the body, the carrier comprising a threaded rod having at one end, an auger for rotatably receiving and securing the fruit or vegetable and a rotation handle attached to an opposing end; and
   a reversing mechanism positioned on said post and configured to automatically reverse a rotating direction of the carrier without requiring a user to activate the reversing mechanism or change a rotation direction of the handle, the carrier passing through said reversing mechanism and including means for engaging the same.

9. The device of claim 8, wherein said reversing mechanism further comprises:
   a housing positioned around the carrier;
   a linear rod positioned in the housing and extending beyond the same in two directions;

a forward linear thread block in communication with the linear rod and in selective communication with the threaded portion of the carrier;

a reverse linear thread block in communication with the linear rod and in selective communication with the threaded portion of the carrier;

a first kick disk positioned at one end of the threaded rod of the carrier;

a second kick disk positioned at the other end of the threaded rod of the carrier;

wherein said first and second kick disks are configured to engage the linear rod during rotation of the carrier and thereby enable the engagement or disengagement of the forward or reverse thread blocks depending on a current direction of rotation of the carrier.

10. A device for extracting zest comprising:

a base having a post;

a blade arm having one end configured to be received by said post and opposing end;

spring means in communication with said blade arm and configured to bias said blade arm in a predetermined direction toward a fruit or vegetable to be processed;

a blade coupled to an opposing end of the blade arm and being configured to separate a portion of the flavedo from the pith of a fruit or vegetable's peel while the fruit's peel contacts the blade and moves relative to the blade;

a carrier coupled to the body, and configured to hold the fruit or vegetable while the blade separates a portion of the flavedo from the pith of the fruit or vegetable's peel; and a reversing mechanism positioned on said post and in communication with the carrier, said reversing mechanism being configured to automatically reverse a rotation direction of the carrier without requiring a user to activate the reversing mechanism or change a rotation direction of the handle.

11. The device of claim 10, wherein said carrier comprises a threaded rod having at one end, means for receiving and securing the fruit or vegetable and a rotation handle attached to an opposing end.

12. The device of claim 11, wherein said means for receiving and securing comprises an auger for rotatably engaging the fruit or vegetable and thereby securing the same.

* * * * *